United States Patent [19]

Aoki

[11] Patent Number: 5,333,182
[45] Date of Patent: Jul. 26, 1994

[54] ARBITRARY SELECTING OF A TERMINAL TO BE CALLED IN KEY TELEPHONE SYSTEMS

[75] Inventor: Takashi Aoki, Akishima, Japan

[73] Assignee: Kabushiki Kaisha Toshiba, Kanagawa, Japan

[21] Appl. No.: 794,524

[22] Filed: Nov. 19, 1991

[30] Foreign Application Priority Data

Nov. 20, 1990 [JP] Japan .................................. 2-314636

[51] Int. Cl.$^5$ ...................... H04M 11/00; H04M 1/00
[52] U.S. Cl. ......................................... 379/97; 379/93; 379/94; 379/156
[58] Field of Search ................. 379/156, 164, 165, 93, 379/94, 96, 97, 98, 212; 375/8, 121

[56] References Cited

U.S. PATENT DOCUMENTS

| | | | |
|---|---|---|---|
| 4,850,012 | 7/1989 | Mehta et al. | 379/164 |
| 4,930,151 | 5/1990 | Walton et al. | 379/94 |
| 4,958,369 | 9/1990 | Tsuchida | 379/156 |
| 5,086,458 | 2/1992 | Bowen | 379/386 |
| 5,109,402 | 4/1992 | Anderson et al. | 379/165 |
| 5,109,406 | 4/1992 | Mano et al. | 379/93 |

Primary Examiner—Curtis Kuntz
Assistant Examiner—Jason Chan
Attorney, Agent, or Firm—Finnegan, Henderson, Farabow, Garrett & Dunner

[57] ABSTRACT

A key telephone system is disclosed including a key service unit to which are connected a communication network such as public telephone network, a plurality of data terminal equipments such as personal computers, and interface conversion unit such as MODEM. When a call comes from external calling party into this system, the key service unit establishes a communication path between the network and the interface conversion unit so that succeeding data transmitted from the calling party supplied to the interface conversion unit. The succeeding communication data includes an extension number selected by the calling party, and the extension number is informed to the key service unit from the interface conversion unit. Then, the key service unit establish a communication path between a single data terminal equipment designated by the extension number and the interface conversion unit, so that the calling party can communicate with the designated data terminal equipment.

10 Claims, 18 Drawing Sheets

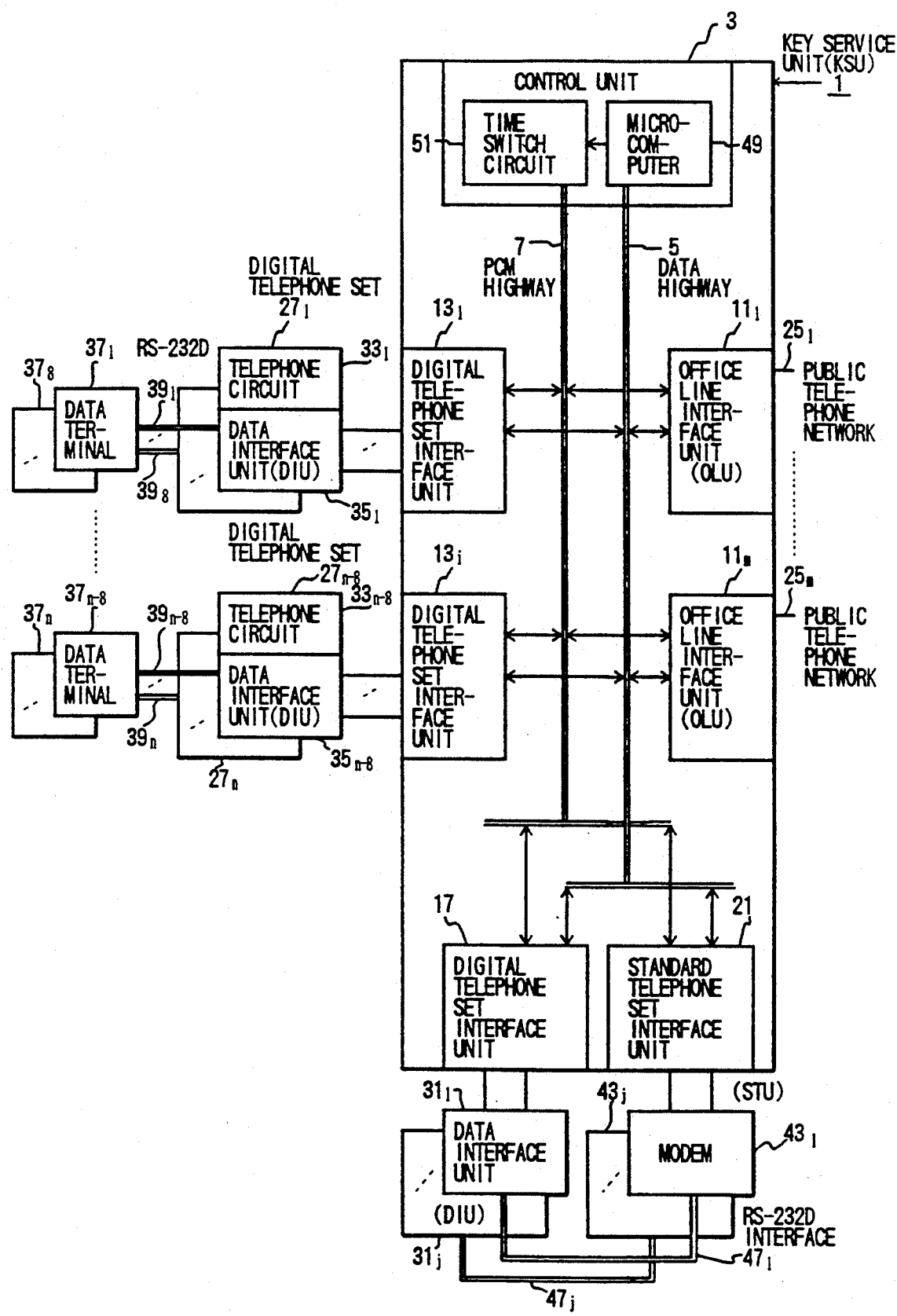
F I G. 1

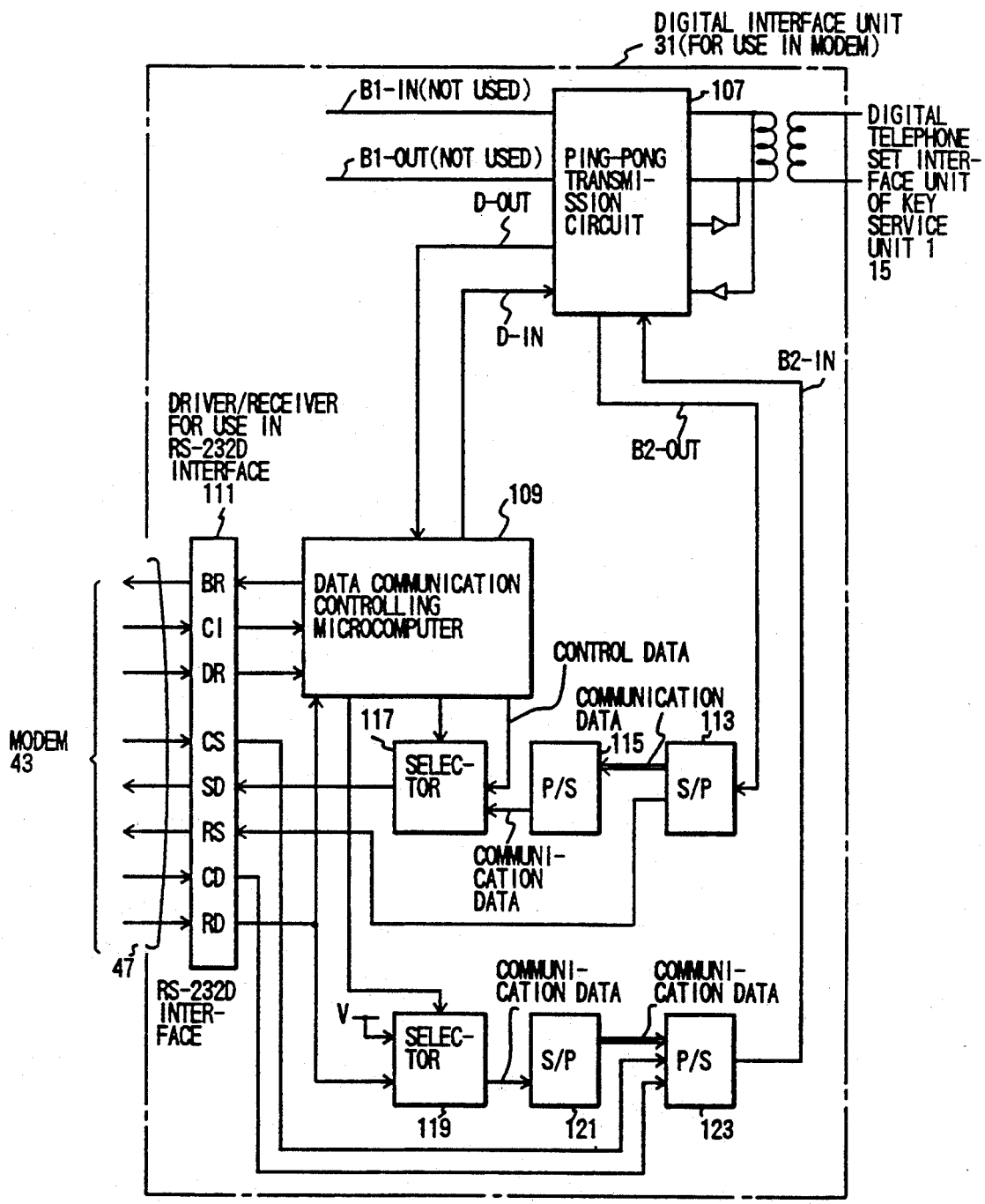
F I G. 4

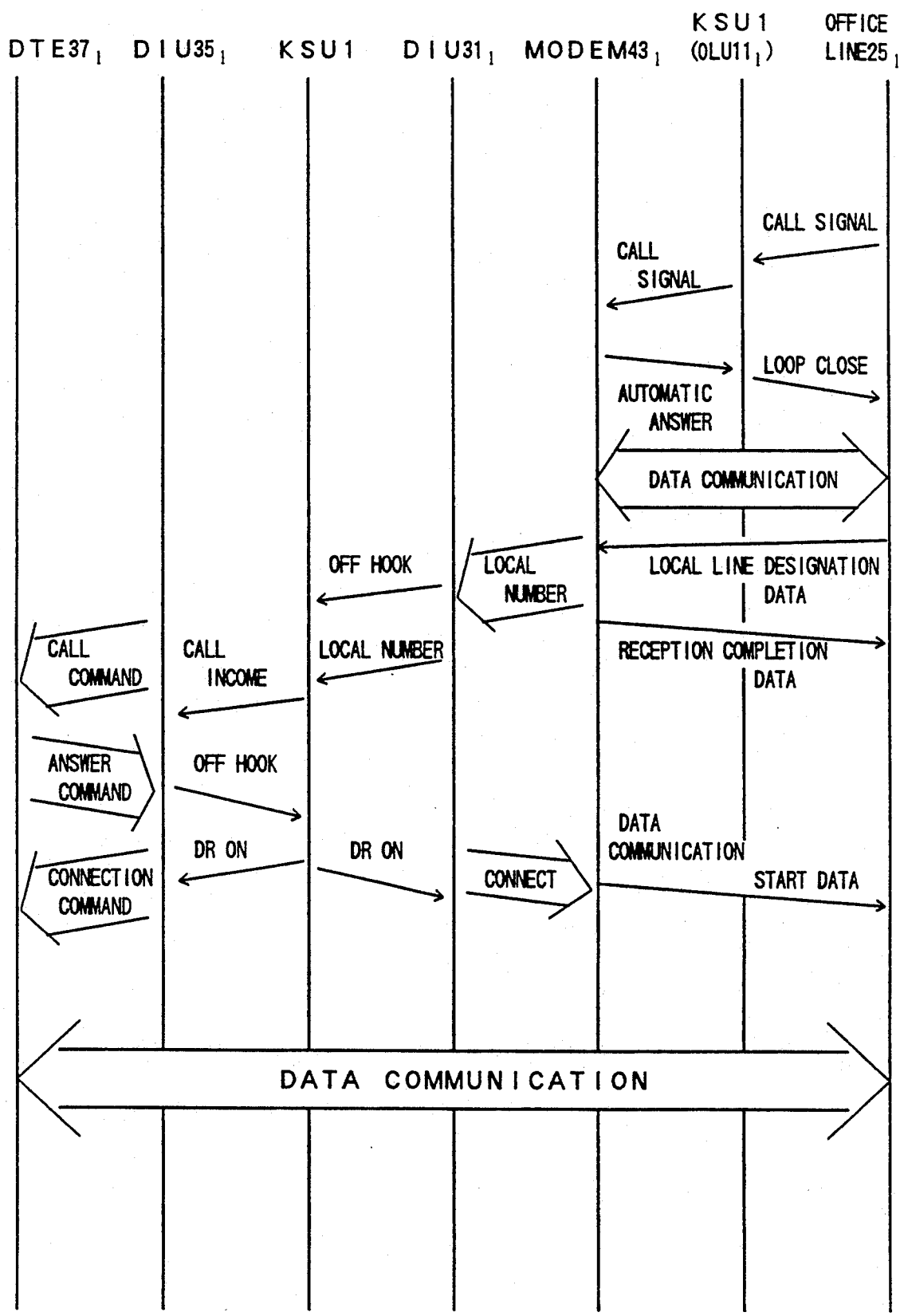
F I G. 9

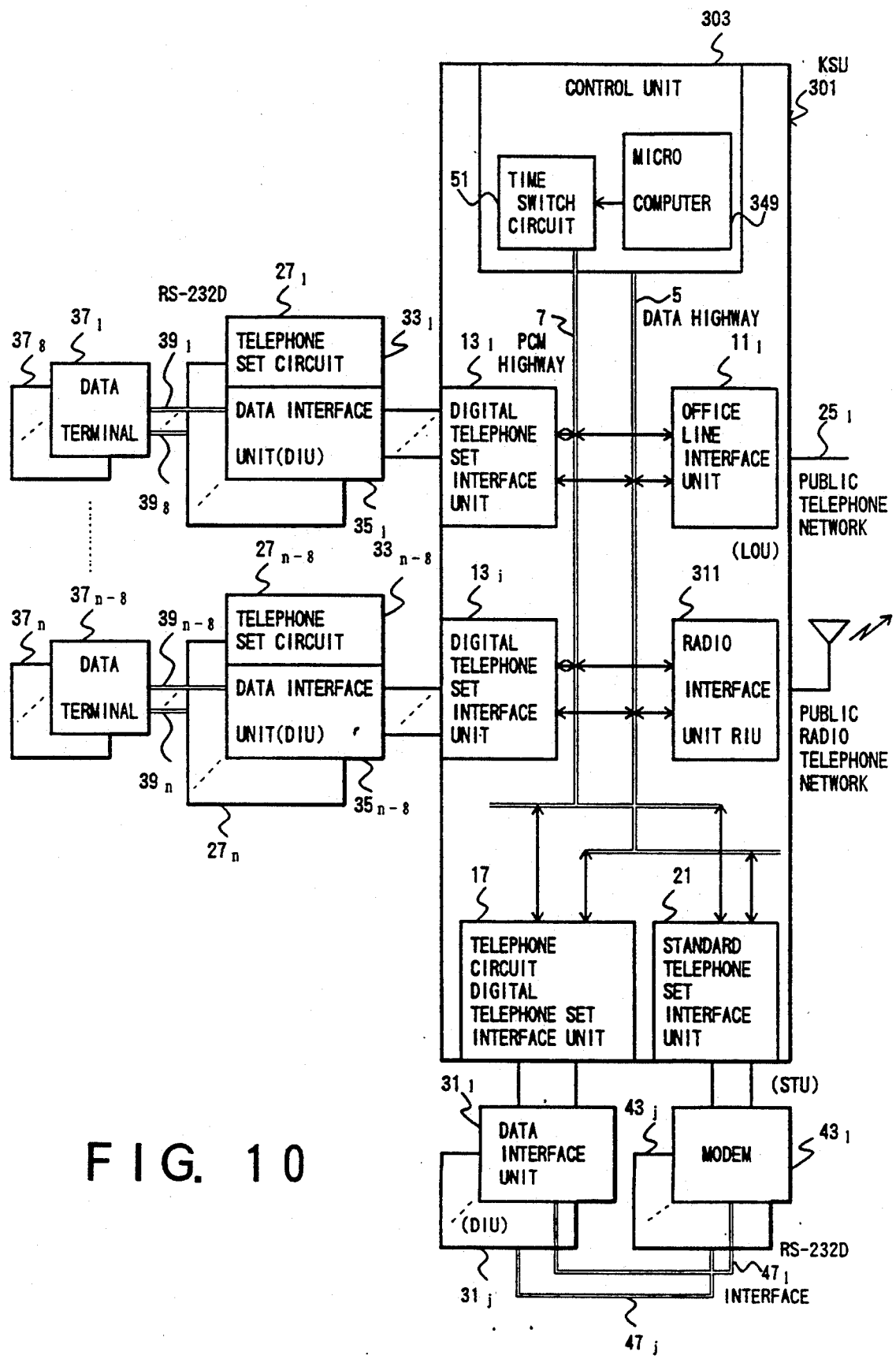
F I G. 10

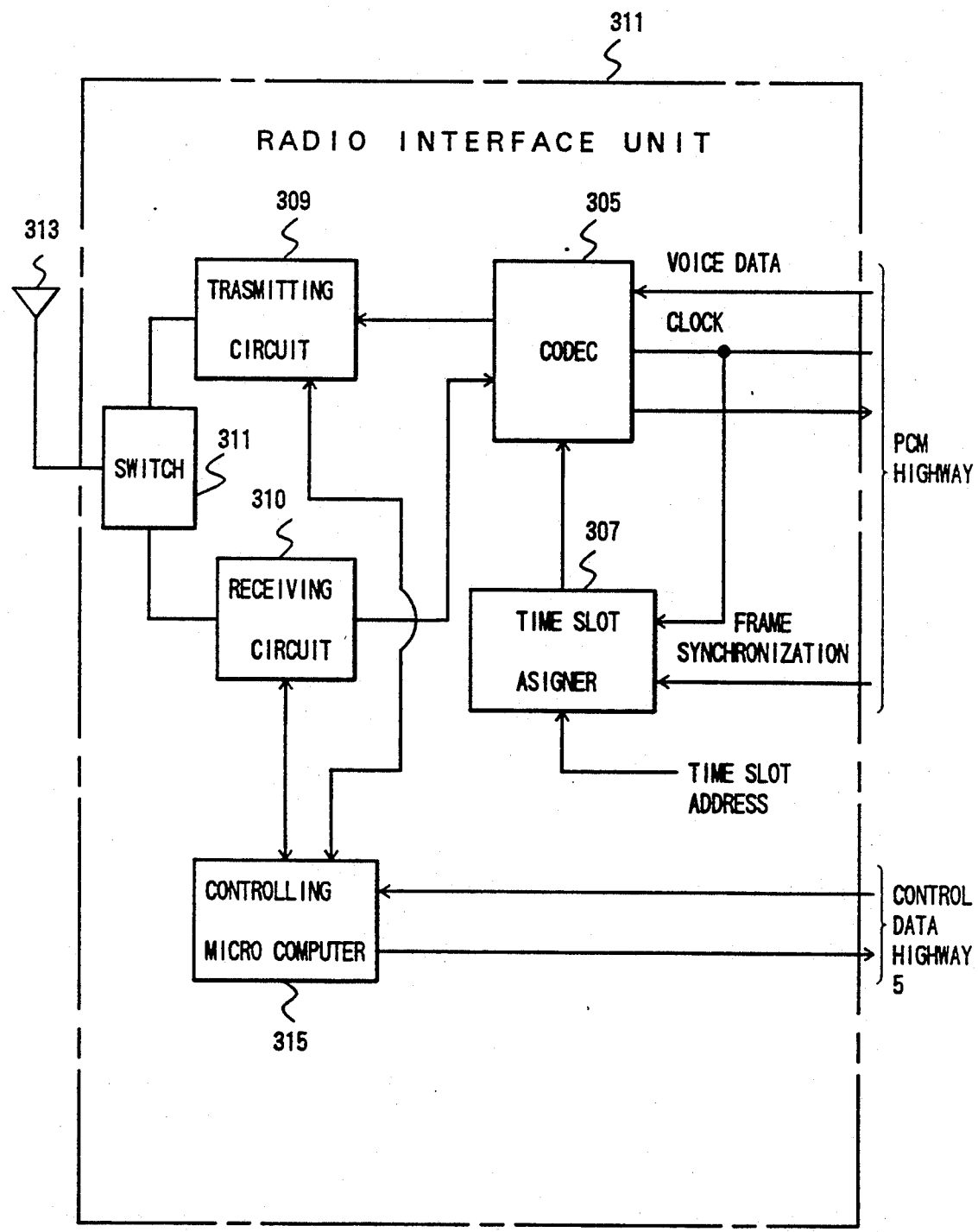
F I G. 11

ARBITRARY SELECTING OF A TERMINAL TO BE CALLED IN KEY TELEPHONE SYSTEMS

BACKGROUND OF THE INVENTION

This invention generally relates to a key telephone system, more particularly a key telephone system having a plurality of data terminal equipments, such as personal computers, as extensions.

In a prior art system of this type, a data terminal used to answer to an incoming call from an office line has been predetermined. When an incoming call is received from an office line a call signal is sent to the predetermined data terminal, and due to the answer of the data terminal a connection is established in the system via a modulator-demodulator (MODEM) between the data terminal and the office line for starting a speech communication.

Such prior art system has a problem that a calling party can not arbitrary select a data terminal the calling party desires to be called.

As an approach for solving this problem, a service called a PBX dial-in can be used. According to this PBX dial-in service, since after receiving an incoming call, an extension selection signal is sent from a telephone office to the system, the system can select a data terminal to be called. However, all systems can not always enjoy the PBX dial-in service- More particularly, since an extension selection signal of the PBX dial-in system is a multi-frequency (MF) signal, only a system constructed according to a MF signal specification can enjoy the service so that many systems constructed according to the dial pulse specification can not enjoy the PBX dial-in service.

SUMMARY OF THE INVENTION

Accordingly, it is an object of this invention to provide a novel key telephone system enabling a calling party to select a data terminal to be called.

According to one aspect of this invention, there is provided a key telephone system connected to communication network and having a plurality of data terminal equipments as extensions, the key telephone system comprising: an interface conversion unit for performing a conversion between a user interface of the communication network and a data communication interface of each data terminal equipment, the interface conversion unit having a performance of answering to an incoming call from the communication network; connecting means for interconnecting the communication network and the interface conversion unit; switching means for selectively establishing a data communication path between the respective data terminal equipments and the interface conversion unit; extension calling means for receiving an extension number data contained in succeeding communication data sent from the communication network, and after the interface conversion unit has answered to an incoming call from the communication network for sending an incoming call command to a single data terminal equipment designated by the local number data; and switching control means for controlling the switching means to establish the data communication path between the designated single data terminal equipment and the interface conversion unit in order to establish a data communication link between the designated single data terminal equipment and the communication network.

According to another aspect of this invention there is provided a key telephone system including a key service unit connected to a communication network and a plurality of data terminal equipments connected to the key service unit, the key telephone system comprising: an interface conversion unit effecting a conversion between a user interface of the communication network and a communication interface of each data terminal equipment; each interface conversion unit having a performance of answering to an incoming call from the communication network; the interface conversion unit being connected to the key service unit; wherein the key service unit includes: a communication network interface unit connected to the user interface of the communication network; a plurality of first data interface units respectively connected to the data communication interfaces of the plurality of data terminal equipments; a user interface unit connected to an interface for the communication network of the interface conversion unit, for affording an identical interface to the user interface of the communication network; a second data interface unit connected to an interface for the data terminal equipments of the interface conversion unit, for affording an identical interface to the communication interface of the data terminal equipments; a switching unit for selectively forming a data communication path among the communication network interface unit, the plurality of first data interface units, the user interface unit, and the second data interface unit; and a microcomputer connected to the communication network interface unit, the plurality of first data interface units, the user interface unit, the second data interface unit, and the switching unit for controlling these units; wherein the microcomputer includes: means for controlling the switching unit for establishing a first data communication path between the communication network interface unit and the second data interface unit so as to supply succeeding communication data from the communication network to the interface conversion unit, when an incoming call reaches the communication network interface unit from the communication network; means for receiving an extension number data contained in the succeeding communication data from the interface conversion unit through the second data interface, when the succeeding communication data is inputted to the interface conversion unit, thereby controlling the single first data interface unit corresponding to a single data terminal equipment designated by the extension number data so as to send an incoming call command to the designated single data terminal equipment; and means for establishing a second data communication path between the corresponding single first data interface unit and the second data interface unit, when the selected single data terminal answers to the call command, thereby establishing a data communication link between the designated single data terminal equipment and the communication network through the interface conversion unit.

BRIEF DESCRIPTION OF THE DRAWINGS

In the accompanying drawings:

FIG. 1 is a block diagram showing the entire construction of one embodiment of a key telephone system constructed according to the teaching of this invention;

FIG. 4 is a block diagram showing the construction of the data interface unit (DIU) for use in the MODEM shown in FIG. 1;

FIG. 9 is a chart showing the system operation;

FIG. 10 is a block diagram showing the entire construction of a modified embodiment of this invention;

FIG. 11 is a block diagram showing the construction of wireless or radio interface unit (RIU) shown in FIG. 10;

DESCRIPTION OF THE PREFERRED EMBODIMENTS

Figure 2:
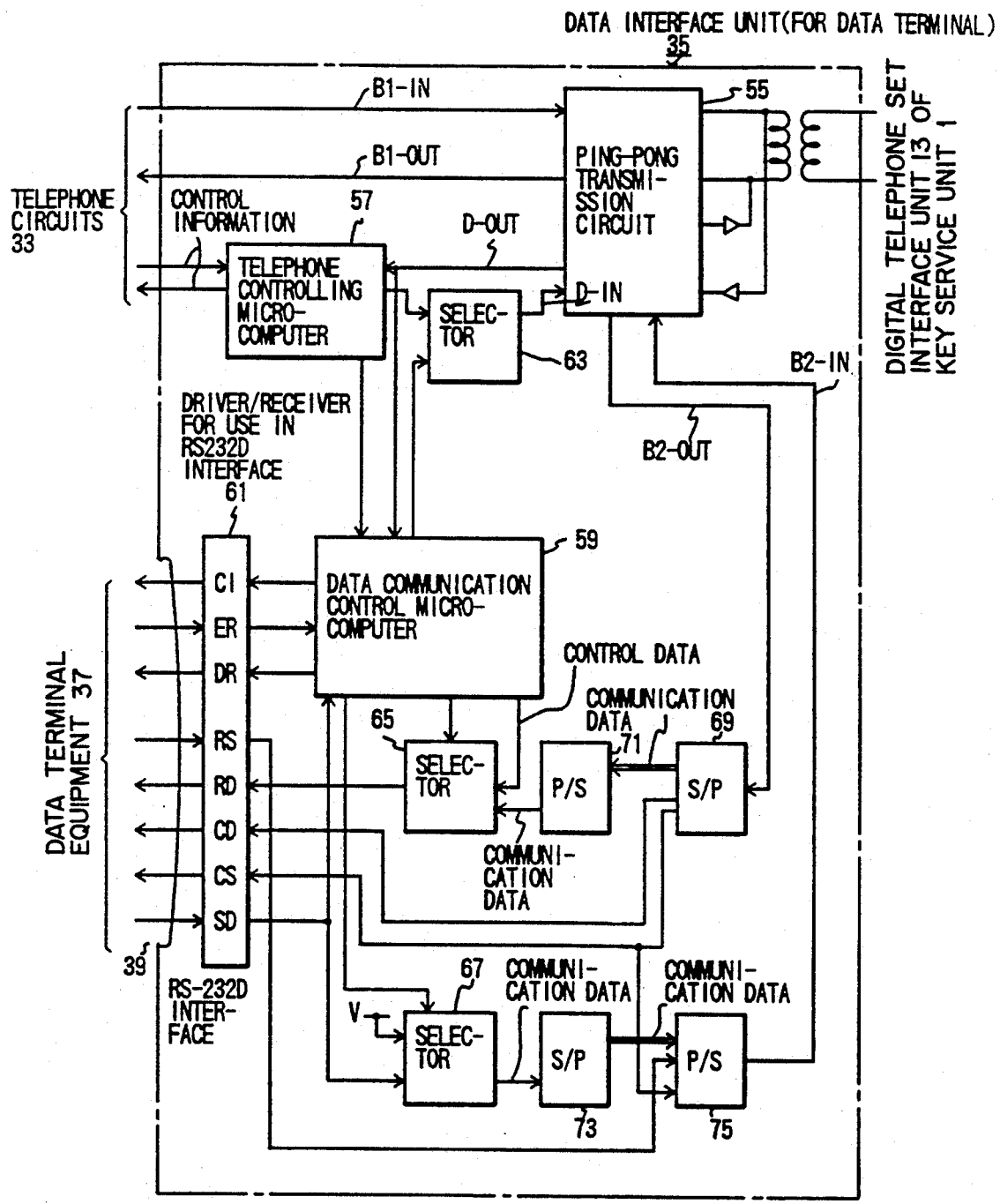
FIG. 2 is a block diagram showing the construction of a data interface unit (DIU) for use in the data terminal shown in FIG. 1.

The system of the first embodiment of a key telephone system of this invention comprises a key service unit 1 including a control unit 3 mainly controlling a call processing and a speech channel exchange, a data highway 5 acting as a control data transmission path, a PCM highway 7 acting as time division speech channels and various interface units 11, 13, 17, and 21. Describing in more detail, these interface units include office line interface units $11_1$–$11_m$ connected to office lines $25_1$–$25_m$ of public telephone network (analog networks), digital key telephone interface units $13_1$–$13_n$ and 17 connected to digital key telephone sets $27_1$–$27_n$ or the data interface unit 31, and a standard telephone set interface unit 21 for connecting a standard telephone set (an analog telephone set).

To the digital telephone set interfaces $13_1$–$13_i$ are connected a total of n digital telephone sets $27_1$–$27_n$ at a ratio of 8 telephone sets per one interface unit. Each digital key telephone set 27 contains therein a telephone circuit 33 having a performance of converting A/D and D/A the speech signal exchanged with the key service unit 1 in the form of digital signals, and a data interface unit 35 repeating the digital signal communication between the key service unit 1 and the telephone set circuit 33. The data interface unit 35 is constructed to be connectable with a data terminal equipment 37 having a RS-232D interface, and has a performance of converting a data format of transmitter and receiver data (SD and RD) of RS-232D to a predetermined data format for communication with the key service unit 1.

This system contains j modems (MODEMs) $43_1$–$43_j$.

The MODEM 43 converts the signals between RS-232D interface and a user interface of a public telephone network. The MODEM 43 contains therein a network control unit (NCU) and can perform an incoming call-/originating procedure for the data terminal by using transmitter and receiver data (SD and RD) of RS-232D. The connecting terminals of MODEM 43 for the public telephone network are connected to the standard telephone set interface unit 21, while the connecting terminals of the MODEM 43 for a data terminal equipment are connected to a digital telephone set interface unit 17 via data interface unit 31. A data interface unit 31 interposed between MODEM 43 and the digital telephone set interface unit 17 has a construction similar to that of data interface unit 35 in the digital telephone set 27 except minor points. The data interface unit 31 has a performance of converting a format of the transmitter data SD and the receiver data RD of RS-232D into a format of the data for communication with the digital telephone set interface unit 17.

The control unit 3 comprises a microcomputer 49 for controlling a call and switching operation of the entire key service unit 1, and a time switch circuit 51 for interconnecting time division speech channels in a PCM highway under the control of the microcomputer 49.

In this system, where data terminal 37 performs a data communication with external data devices and apparatus through a public telephone network, a communication channel is established extending through office line 25—office line interface unit 11—PCM highway 7—standard telephone set interface unit 21—MODEM 43—RS-232D interface 47—data interface unit 31—digital telephone set interface unit 17—PCM highway 7 digital telephone set interface unit 13—data interface unit 35—RS-232D interface unit 39—data terminal 37.

The system of this invention is characterized in that at the time of an incoming call from office line 25, with what procedure does the microcomputer 49 establish the communication channel just described.

In the following the constructions of various parts will be described in detail.

FIG. 2 shows the construction of the data interface unit 35 in a digital telephone set 27.

This data interface unit 35 comprises a ping'-pong transmission circuit 55 which effects half duplex communication of digital signals with digital interface unit 13 of the key service unit 1, a telephone control microcomputer which controls the telephone set circuit 33, a data communication control microcomputer 59 that controls data terminal 37, and a RS-232D driver/receiver 61 for effecting level conversion of various signals communicated with data terminal 37 through RS-232D interface 39.

Figure 3:
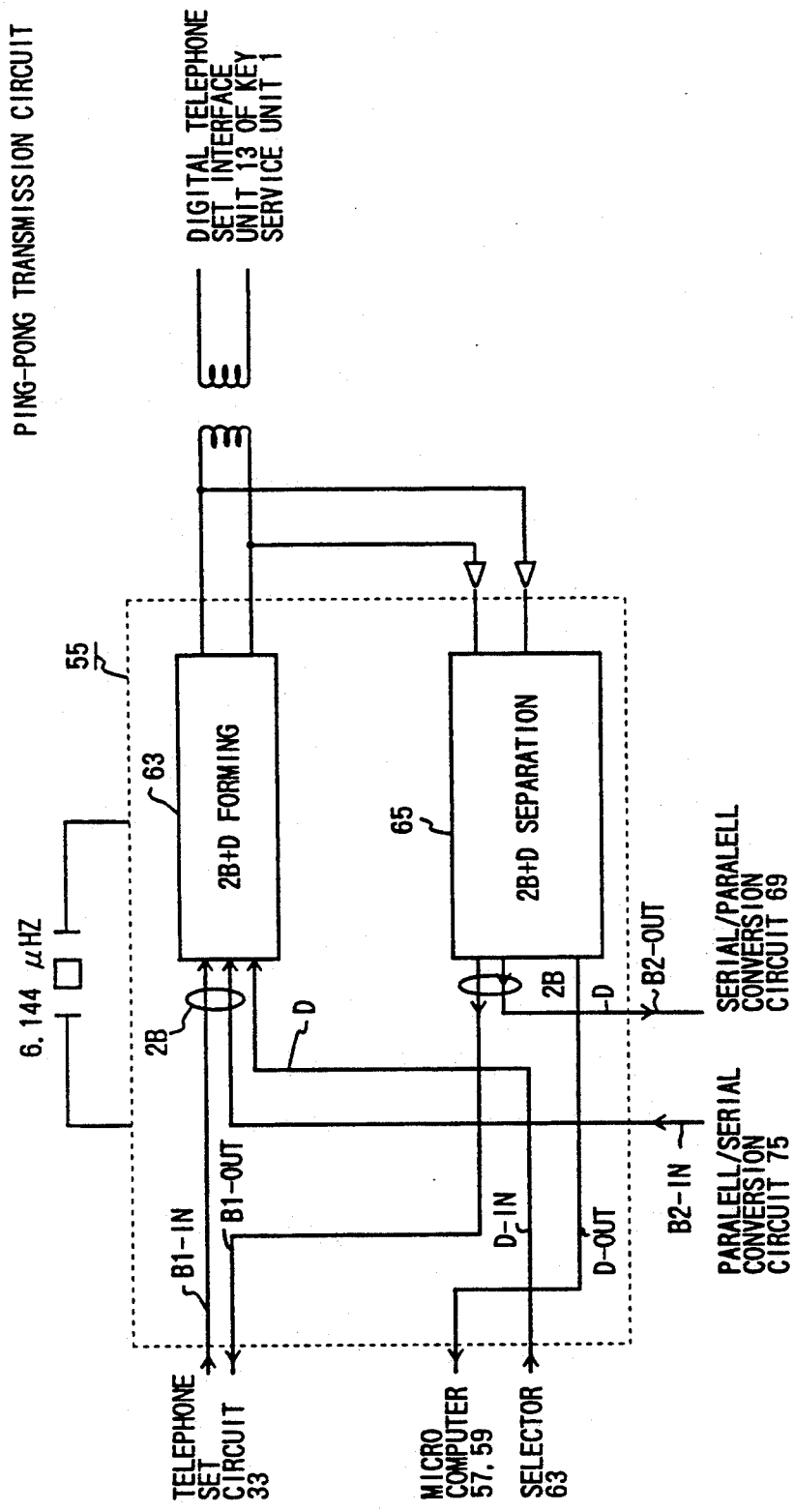
FIG. 3 is a block diagram showing the construction of the ping'-pong transmission line shown in FIG. 2.

The ping'-pong transmission circuit 55 effects a ping'-pong type data communication with key service unit 1 by using a 2B+D type data packet which constituted by one D channel having a speed of 16 Kbps, and two channels (B1, B2) having a speed of 64 Kbps. As shown in FIG. 3, the ping'-pong transmission circuit 55 comprises a 2B+D forming circuit 63 which synthesizes up-stream data of respective channels into a data packet of the 2B+D type and sends the data packet to the key service circuit 1, and a 2B+D separating circuit 2B+D which separates a down-stream packet of the 2B+D type sent from the key service unit 1 into data for respective channels. The B1 channel is allocated for the voice data transmitted from/to the telephone set circuit 33, the B2 channel is allocated for the communication data transmitted from/to the data terminal equipment 37, and the D channel is allocated to the control data transmitted from/to microcomputers 57 and 59. More particularly, the voice data sent out from the telephone set circuit 33 and the communication data sent out from the data terminal equipment 37 are applied to a 2B+D forming circuit 63 as B1 and B2 channel up-stream data B1-IN and B2-IN, respectively. Further, the control data outputted from microcomputers 57 and 59 are also applied to the 2B+D forming circuit 63 as D channel up-stream data D-IN. As a consequence, the 2B+D forming circuit 63 forms a packet of 2B+D and sends it to the key service circuit 1. The packet 2B+D sent from the key service circuit 1 is received by the 2B+D separation circuit 65, in which the received packet is separated into B1 channel down-stream data B1-OUT, B2 channel down-stream data B2-OUT and D channel up-stream data D-IN. These separated data B1-OUT, B2-OUT and D-OUT are sent to the telephone set circuit 33, the data terminal equipment 37 and microcomputers 57 and 59 respectively.

Each of the down-stream and up-stream data B2-OUT and B2-IN of the B2 channel are 8 bit serial data (64 Kbps) of which 6 bits are used as the communication data (48 Kbps). The down-stream data B2-OUT contains a carrier detection signal CD (8 Kbps) and clear to sent signal CS (8 Kbps) of RS-232D as remaining two bits. On the other hand, the up-stream data B2-IN contains a request to send signal RS (8 Kbps) and clear to send signal CS (8 Kbps) of RS-232D. The down-stream data B2-OUT is firstly inputted to a serial/parallel converting circuit 69 which separates the data B2-OUT into a communication data, the carrier detection signal CD and the clear to send signal CS. Further, the communication data is inputted to a parallel/serial converting circuit 71 to be restored to a serial data of 48 Kbps. Further, the up-stream communication data is firstly inputted to a serial/parallel converting circuit 73 to be converted into a parallel data of 64 Kbps and then inputted into a parallel/serial converting circuit 75 to be synthesized with the request to send signal and the clear to send signal CS, thereby forming a 8 bit up-stream data B2-IN.

The telephone controlling microcomputer 57 has such performances as controlling the telephone set circuit (for example, a bell ringing and, ON/OFF control of various displays, etc.) in accordance with the down-stream data D-OUT of the D channel, and as outputting a control data corresponding to a signal from the telephone set circuit 33 (for example, a hook signal, selection signal, etc.) to selector 63. The selector 63 selects control data from either one of the telephone controlling microcomputer 57 and the data communication control microcomputer 59, under the control of the telephone controlling microcomputer 57, thereby sending to the ping'-pong circuit 55 the selected control data as D channel up-stream data D-IN. At the time of sending out the control data, the telephone controlling microcomputer 59 controls selector 63 to cause it to select its sending out control data and prohibits the data communication controlling microcomputer 59 from sending out control data. As a consequence, only during a period in which the telephone controlling microcomputer 59 does not send out a control data, the data communication control microcomputer 59 is permitted to send out a control data which is sent to the key service unit 1 through the D channel.

Based on the D channel down-stream data D-OUT, the data communication control microcomputer 59 has a performance of controlling a call indication signal CI of the RS-232D to be applied to the data terminal equipment 37, and a data set ready signal DR, a performance forming and outputting a control data to be sent to the data terminal equipment 37, and a performance of selecting either one of a command accepting mode and a communication mode. The term command accepting mode means a mode in which only the data communication control microcomputer 59 can access to the transmitter data SD and the receiver data RD of RS-232D. The term communication mode means a mode in which the transmitter data SD and the receiver data RD of RS-232D can be transparently sent to and received from the key service unit 1 via the B2 channel. Actually, this mode selection is performed by selectors 65 and 67 under the control of the data communication control microcomputer 59. Namely, in a communication mode, selector 65 selects a down-stream data from the parallel/serial converting circuit 71 as the receiver data RD, whereas selector 67 selects the transmitter data SD of the RS-232D to send it to the serial/parallel converting circuit 73. On the other hand, in the command receiving mode selector 65 selects a control data from the data communication controlling microcomputer 59 as the receiver data. Further, selector 67 selects a high level constant signal (which means that there is no data) from power supply V.

Data communication controlling microcomputer 59 forms a control data to be sent to the key service unit 1 based on an equipment ready signal ER and a transmittern data SD of RS-232D from the data terminal equipment 37 and sends the control data to the ping'-pong transmission circuit 55 as the D channel up-stream data D-IN.

FIG. 4 shows the construction of the data interface unit 31 for connecting RS-232D interface 47 of MODEM 43 to the digital telephone set interface unit 17 of the key service unit 1.

This data interface unit 31 has a construction similar to that of the data interface unit 35 for use in the data terminal equipment shown in FIG. 2, but differs in that the latter is set as a MODEM mode with respect to the data terminal equipment, while the former is set to the terminal mode with respect to MODEM 43. In other words, the direction of the RS-232D interface signal lines are reversed. Furthermore, since the data interface unit 31 is not contained in the telephone set, the B1 channel for voice data transmission is not used, the telephone controlling microcomputer does not present, and there is no selector for selecting up-stream control data.

Figure 5:
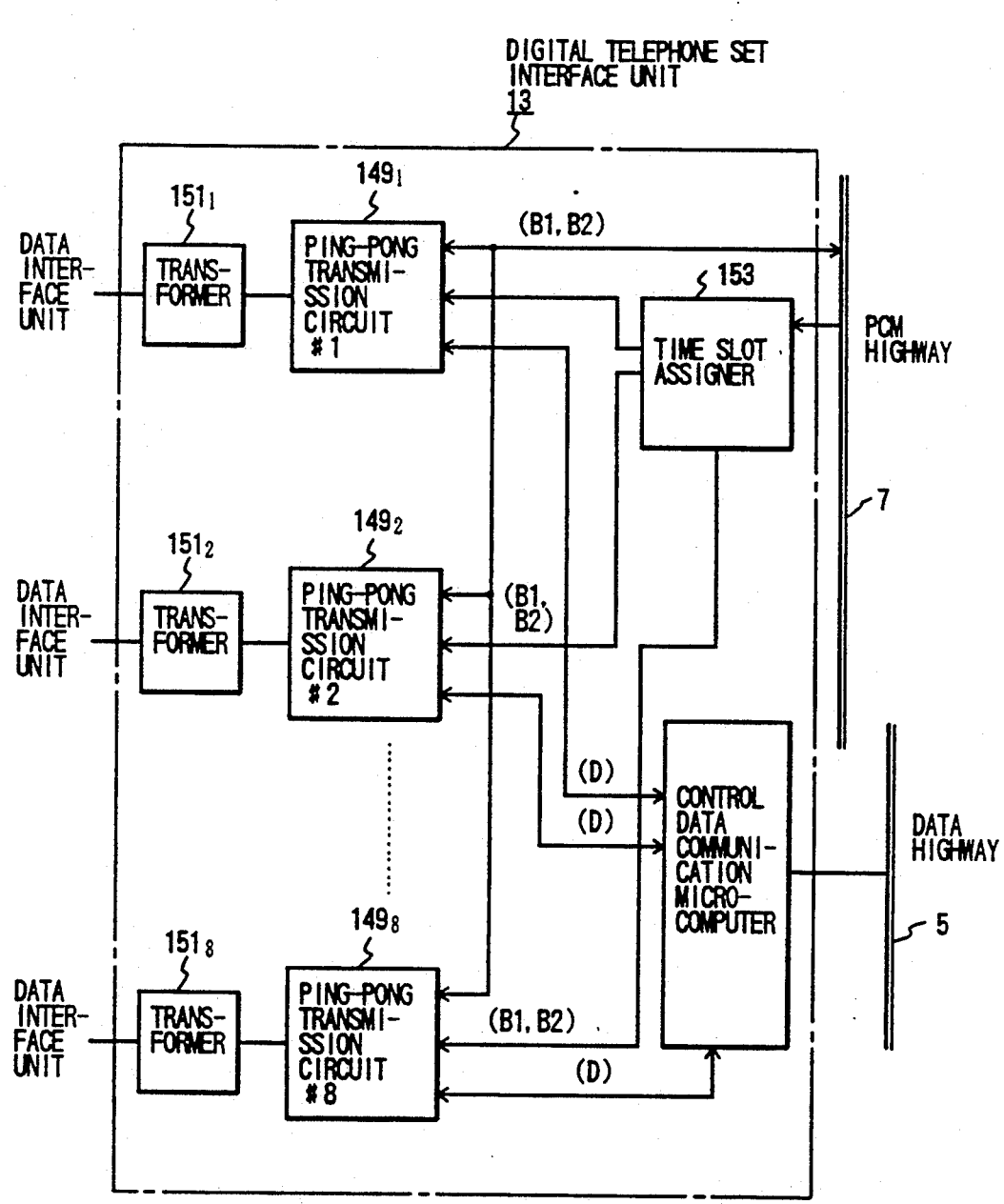
FIG. 5 is a block diagram showing the construction of the digital telephone set interface unit.

FIG. 5 shows the construction of the digital telephone set interface unit 13 in the key service unit 1 for connecting the digital telephone set 27. The digital telephone set interface unit 17 for connecting the data interface unit 31 also has a similar construction.

This interface unit 13 has 8 ping'-pong transmission circuits $149_1$–$149_8$, for example. These transmission circuits are respectively connected to the data interface units 35 of eight telephone sets 27 via digital data transformers 151, and effect the ping'-pong transmission with the telephone sets 27 by using the 2B+D type time division channels. The ping'-pong transmission circuit 149 has a construction similar to that of the ping'-pong transmission circuit 55 in the data interface unit 35 shown in FIG. 3, but the latter operates with a slave mode, whereas the former operates with a master mode. In other words, the ping'-pong transmission circuit 149 of the master mode has a leading right of the packet transmission in the ping'-pong transmission.

The time slot assigner 153 informs respective ping'-pong transmission circuits 149 of the timing of sending and receiving the up-stream and down-stream data of the B channel to and from the PCM highway 7, upon receival of the frame synchronizing signal and a clock pulse from PCM highway 7. Each ping'-pong transmission circuit 149 directly accesses the PCM highway at a time designated by the time slot assigner 153 for transmitting and receiving up-stream and down-stream data at a speed of 2,048 Mbps.

The control data communication microcomputer 150 supervises the D channel data (control data) transmitted and received by respective ping'-pong transmission circuits, and controls the communication of these control data with the control unit 3 through the data highways 5.

Figure 6:
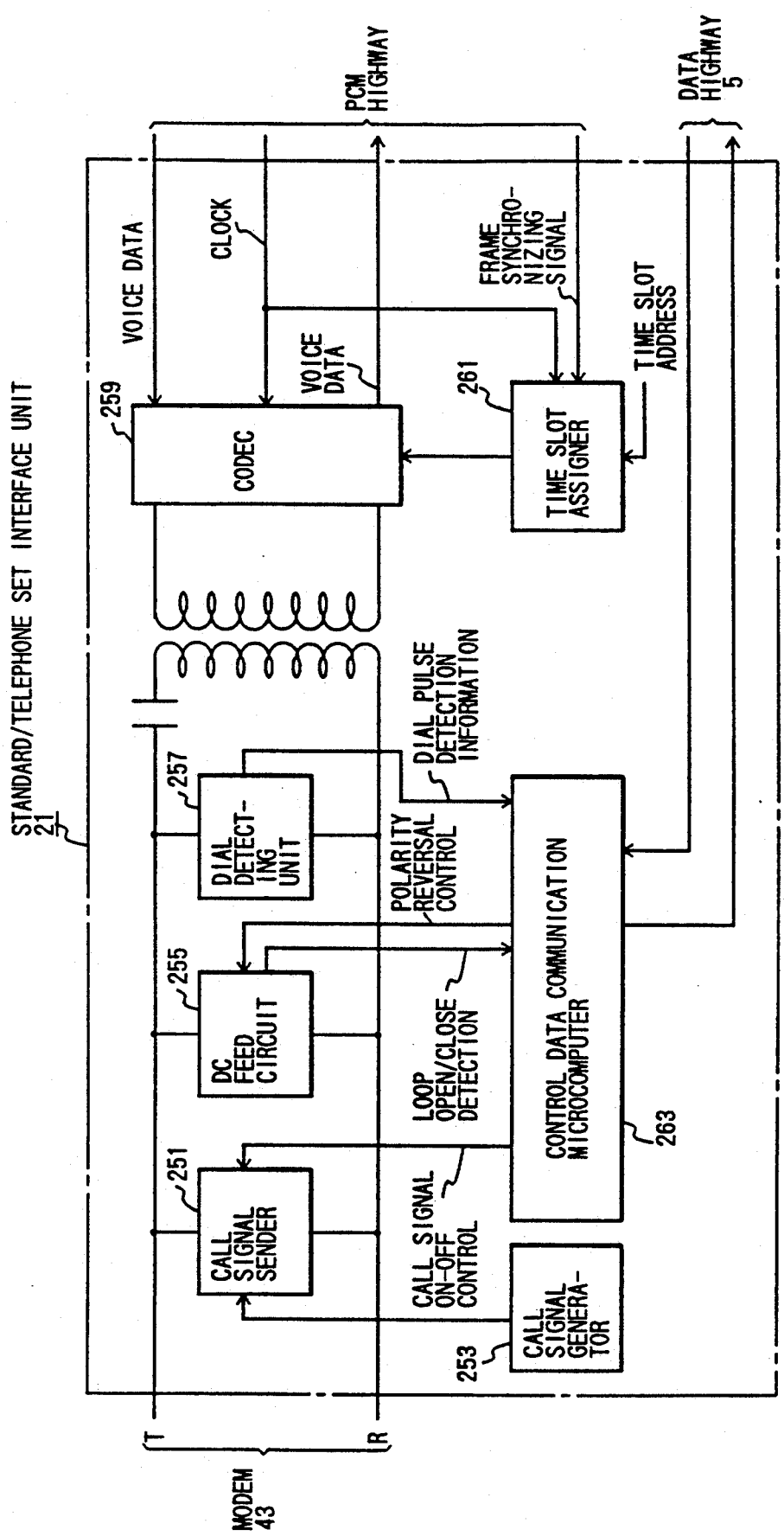
FIG. 6 is a block diagram showing the construction of the standard telephone set interface unit (STU) shown in FIG. 1.

FIG. 6 shows the construction of the standard telephone set interface unit 21 connected to the MODEM 43.

A call signal sending circuit 251 sends a call signal (AC signal of 16 Hz) supplied from a call signal generator 253 to MODEM 43. A DC supply circuit 255 supplies a prescribed DC voltage to MODEM 43, reverses the polarity of the DC voltage, and detects open and close of a DC loop. A dial detecting unit 257 detects the dial pulses.

A CODEC 259 performs A/D and D/A conversion of a voice signal and sends and receives voice data to and from the PCM highway at a time designated by a time slot assigner 261.

The control data communication microcomputer 263 controls the sending out of a call signal, supervises open and close of the DC loop, controls the polarity reversal, supervises the result of dial pulse detection, and communicates the control data with the control unit 3 through data highway 5.

A standard telephone set interface unit 21 includes the call signal sending unit 251, DC supply circuit 255, dial detector 257, dial detecting unit 257 and CODEC 259. This interface unit 21 contains for example 8 combinations of these units 255–259 (in FIG. 6, only one combination is shown) so that a maximum of 8 MODEM 43 can be connected.

Figure 7:
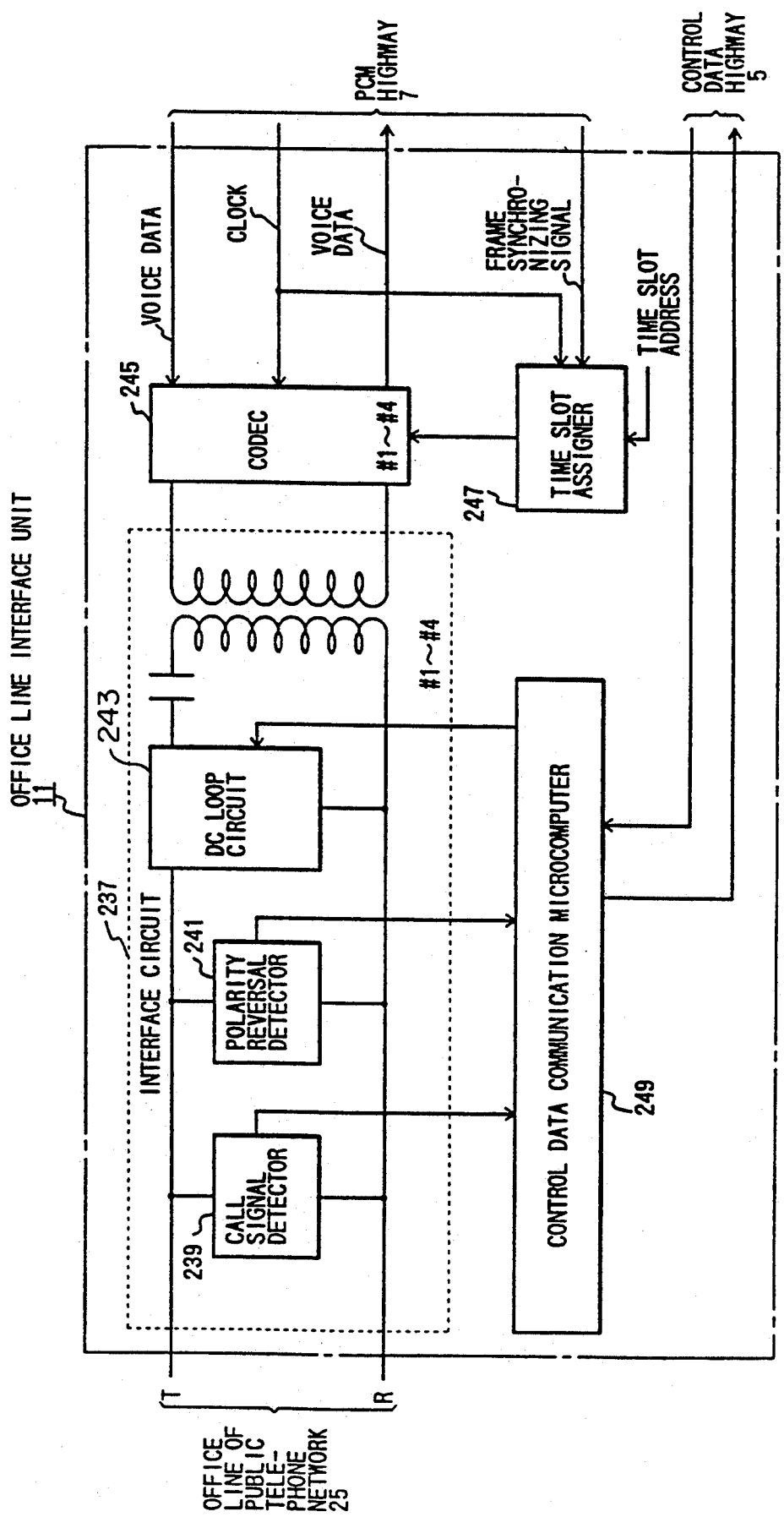
FIG. 7 is a block diagram showing the construction of the office line interface unit (OLU) shown in FIG. 1.

FIG. 7 shows the construction of an office line interface unit for connecting the office line 25.

The interface circuit 237 is provided with a call signal detecting circuit (detection) 230, a polarity reversal detecting circuit (detector) 241 and a DC loop circuit 243, and is connected to an office line of a public telephone network for effecting detection of a call signal from the office line 25, detection of the polarity reversal of the office line 25, close/open of the DC loop, and sending out of a dial pulse to the office line. CODEC 245 performs D/A and A/D conversions of a voice signal. When the DC loop of the office line 25 is closed by the DC circuit 243, the CODEC 245 is coupled with the office line 25 in the manner of AC connection. Four combinations of the interface circuit 237 and CODEC 245 are contained in a single office line interface unit 11, for example (in FIG. 7, only one combination is shown).

The time slot assigner 247 determines the timing at which each CODEC exchanges voice data with the PCM highway in accordance with a time slot address predetermined for each CODEC, a frame synchronizing signal from PCM highway 7 and a clock pulse, and informs of the determined timing to respective CODECs 245. Each CODEC 245 exchanges voice data with the PCM highway at a time designated by time slot assigner 247.

The control data communication microcomputer 249 performs supervision of detection signals form the call signal detecting circuit 239 and from the polarity reversing circuit 241, control for the DC loop circuit 243, and communication with the control unit 3 through the control data highway 5 of the control data with respect to call signal detection, polarity reversal detection, to open and close of the DC loop, and sending out of a dial pulse.

The construction of the microcomputer 49 in the control unit 3 in the key service unit 1 will now be described. The microcomputer 49 controls the call and switching operation of the key telephone system as a whole. Of these performances, a performance of controlling the call and switching operation at a time of an incoming call, which is directly related to this invention, will be described with reference to FIG. 8.

Figure 8:
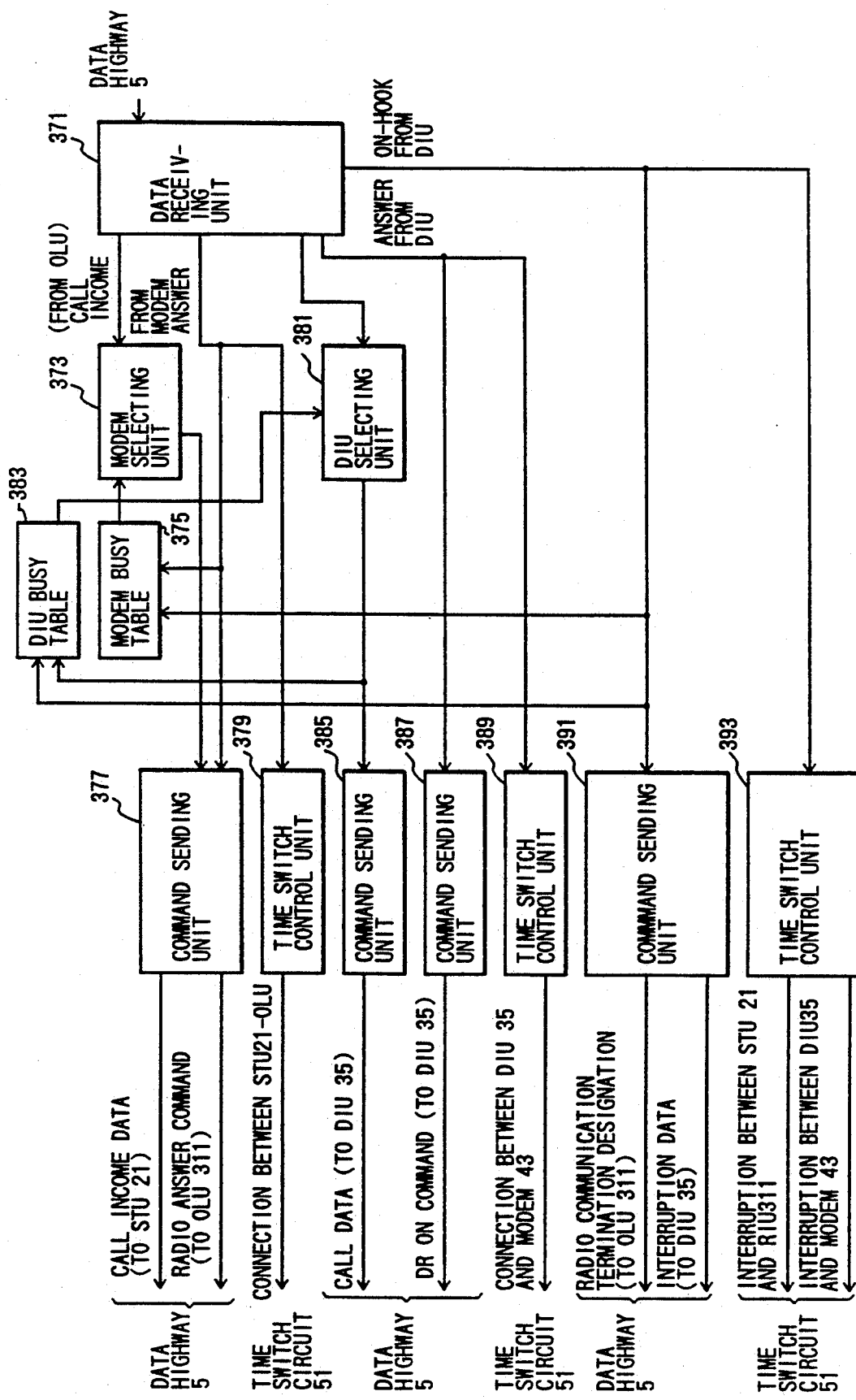
FIG. 8 is a block diagram showing the performance of a microcomputer of the control unit shown in FIG. 1.

In FIG. 8, control data from various parts of the system are inputted to data receiving unit 371 through the data highway 5 to be decoded in the data receiving unit 371. Where the result of decoding is an incoming call from a predetermined office line for data communication, for example office line 25$_1$, the MODEM selecting unit 373 is started to read a MODEM busy table 375. The MODEM busy table 375 has been written with respective present states of MODEMs 43$_1$–43$_j$. In other words, informations indicating idle or busy have been written. The MODEM selecting unit 373 selects a single idle MODEM, for example MODEM 43$_1$, by referring to the MODEM busy table 375 and informs the idle MODEM 43$_1$ to a command sending unit 377. This command sending unit 377 sends the incoming call data for calling the selected MODEM 43$_1$ to the standard telephone set interface unit (STU) 21.

Where the result of decoding at the data receiving unit 371 shows an answer of the MODEM 43$_1$ to the incoming call, this answer is informed to the command sending unit 377 and a time switch control unit 379. Then the command sending unit 377 commands the office line interface unit (OLU) 11 to close the DC loop (to capture the office line 25$_1$). Further, the time switch control unit 379 controls a time switch circuit 51 to interconnect OLU 11$_1$ and STU 21, whereby a communication path between MODEM 43$_1$ and a calling party is established. In the MODEM busy table 375 the state of the MODEM 43$_1$ is changed from idle to busy.

Where the result of decoding at the data receiving unit 371 represents a designation of a extension number inputted to MODEM 43$_1$ from a calling party via a communication bus line, the DIU selecting unit 383 would be started for reading the DIU busy table 383. The DIU busy table 383 has been written with the state (idle or busy) of DIU 35$_1$–35$_n$ of respective digital key telephone sets 27$_1$–27$_n$. The DIU selecting unit 383 reads out the state of a single DIU, for example 35$_1$ specified by the extension number from the DIU busy table 383. When the result shows an idle, the extension number of its DIU 35$_1$ is informed to a command sending unit 385. Then this unit 385 sends the incoming call data to DIU $35_1$ for calling the data terminal $37_1$. In the DIU busy table 383, the state of DIU $35_1$ is changed from idle to busy.

When the result of decoding of the data receiving unit 371 shows an answer of DIU $35_1$ to the call data, this fact is informed to the command sending unit 387 and a time switch control unit 389. The command sending unit 387 sends a MODEM connection command representing the connection between the data terminal equipment $37_1$ and MODEM $43_1$ to DIU $35_1$ and DIU $31_1$, and the time switch control unit 389 controls the time switch circuit 51 to interconnect DIU $35_1$ and DIU $31_1$. As a consequence, a communication path is established between data terminal $37_1$ and MODEM $43_1$. As a consequence, data communication is started through the public telephone network between data terminal equipment $37_1$ and the calling party.

Where the result of decoding of the data receiving unit 371 shows an off-hook state of DIU $35_1$ after initiating the data communication, this state is informed to command sending unit 391 and time switch control unit 393. The command sending unit 391 gives an instruction for opening the DC loop of the office line $25_1$ to OLU $11_1$ and sends an interruption data showing the interruption of the communication paths to DIU $35_1$. The time switch control unit 393 controls time switch circuit 51 to interrupt both communication paths between MODEM $43_1$ and OLU $11_1$, and between MODEM $43_1$ and DIU $35_1$, thereby terminating the data communication. The state of MODEM $43_1$ in the MODEM busy table 375 and the state of DIU 351 in the DIU busy table 383 are changed to idle from busy.

The operation of the system from an incoming call to the initiation of data communication will be described hereinunder with reference to FIG. 9.

Upon receival of a call signal (an AC signal of 16 Hz, for example) from the office line $25_1$ to OLU $11_1$, in the key service unit (KSU), OLU 111 informs of this incoming call to the microcomputer 49 in the control unit 3 so that the microcomputer 49 selects an idle MODEM, for example 431. Then the microcomputer 49 sends to STU 21 an incoming call data for calling the selected MODEM $43_1$. In response to this call income data, the STU 11 sends a call signal (AC signal of 16 Hz, for example) to the selected MODEM$43_1$.

When receiving the call signal, MODEM $43_1$ automatically answers to STU 11. Then STU 21 sends an answer data to the microcomputer 49 so that the microcomputer 49 causes OLU $11_1$ to capture (to close the DC loop of) office line $25_1$, while at the same time controls time switch circuit 53 to interconnect STU 21 and OLU $11_1$. As a consequence, a communication path for data communication between MODEM $43_1$ and the calling party is established.

After the communication path has been established between MODEM $43_1$ and the calling party in a manner described above, the calling party sends data for designating any extension number in the system as a part of the communication data. This extension number designation data is received by MODEM $43_1$ through the communication path and then transferred to DIU $31_1$. Upon completion of receival of the extension number designation data, the MODEM $43_1$ returns the receival completion data to office line $25_1$. DIU $31_1$ supplied with the extension number designation data sends to KSU 1 data showing an off-hook state of MODEM $43_1$ and data showing the designated extension number. In the KSU 1, these data are received by the microcomputer 49, which checks whether a DIU specified by the designated extension number, for example $35_1$, is idle or busy. When it is idle an incoming call data is sent to its DIU $35_1$. When supplied with the incoming call data, DIU $35_1$ sends an incoming call command showing an incoming call to data terminal equipment $37_1$.

Upon receival of this incoming call command, the data terminal equipment $37_1$ returns to DIU $35_1$ an answer command showing the answer to the incoming call. Then DIU $35_1$ sends to KSU 1 an answer of the data terminal $37_1$, and this information is sent to a microcomputer 49 in KSU 1. When the microcomputer 49 acknowledges the answer of data terminal equipment $37_1$, a MODEM connection command is sent to DIU $35_1$ and $31_1$, and the time switch circuit 51 is controlled to establish a communication path between DIU $35_1$ and DIU $31_1$. DIU $35_1$ and DIU $31_1$ which have been supplied with the MODEM connection command are respectively changed from the command mode to the communication mode, and send to the data terminal equipment $37_1$ and MODEM $43_1$ a connection command showing a connection command sends a data communication initiating data to office line $25_1$ so that the data terminal equipment $37_1$ starts a data communication.

As above described, in this system, when MODEM $43_1$ answers to the incoming call for the data communication, a communication path between the calling party and MODEM $43_1$ is firstly established. Thereafter, when a data designating an extension number is sent from the calling party the system as a communication data, this data is received by MODEM $43_1$ and then transferred to the control unit 3 of the system for calling the data terminal equipment of the designated extension number, for example $37_1$. When this data terminal equipment $37_1$ answers to the call, a communication path between its data terminal equipment $37_1$ and MODEM $43_1$ is established. As a consequence, the calling party can perform a data communication with the data terminal $37_1$ designated by the party.

In this case, the call originating operation of the calling party is an operation in which following an off-hook a desired extension number is outputted. This is an operation similar to the call originating operation of the data terminal equipment 37 in the system.

FIG. 10 is a block diagram showing another embodiment of this invention.

In this embodiment, a key service unit 301 includes a radio interface unit $31_1$ for accessing a public radio telephone network for effecting a radio telephone communication such as a mobile radio telephone communication. Other component parts are identical to the system shown in FIG. 1.

FIG. 11 is a block diagram showing the construction of a radio interface unit 311.

Referring to FIG. 11, a CODEC 305 receives voice data from PCM highway 7 at a time slot designated by a time slot assigner 307, and then transfer the voice data to transmitting circuit 309. The CODEC 305 also receives a voice data from the receiving circuit 310, then transfers the voice data to the PCM highway at a time slot designated by time slot assigner 307.

A control microcomputer 315 receives control data from the control data highway 5 and sends one type of control data to transmitting circuit 309, whereas other type control data are used to control transmitting circuit 309 and receiving circuit 310. The control microcomputer 315 receives control data from receiving circuit 310 and transfers the control data to control data highway 5.

The transmitting circuit 309 transmits the voice data from CODEC 305 and the control data from microcomputer 315 to a radio antenna 313 through transmitting-/receiving switch 311 and these data are sent to a radio telephone network. The receiving circuit 310 receives voice and control data received by the radio antenna from the radio telephone network through transmitting-/receiving switch 311, and sends the voice data to the CODEC 305 and sends the control data to the control microcomputer 315.

Figure 12:
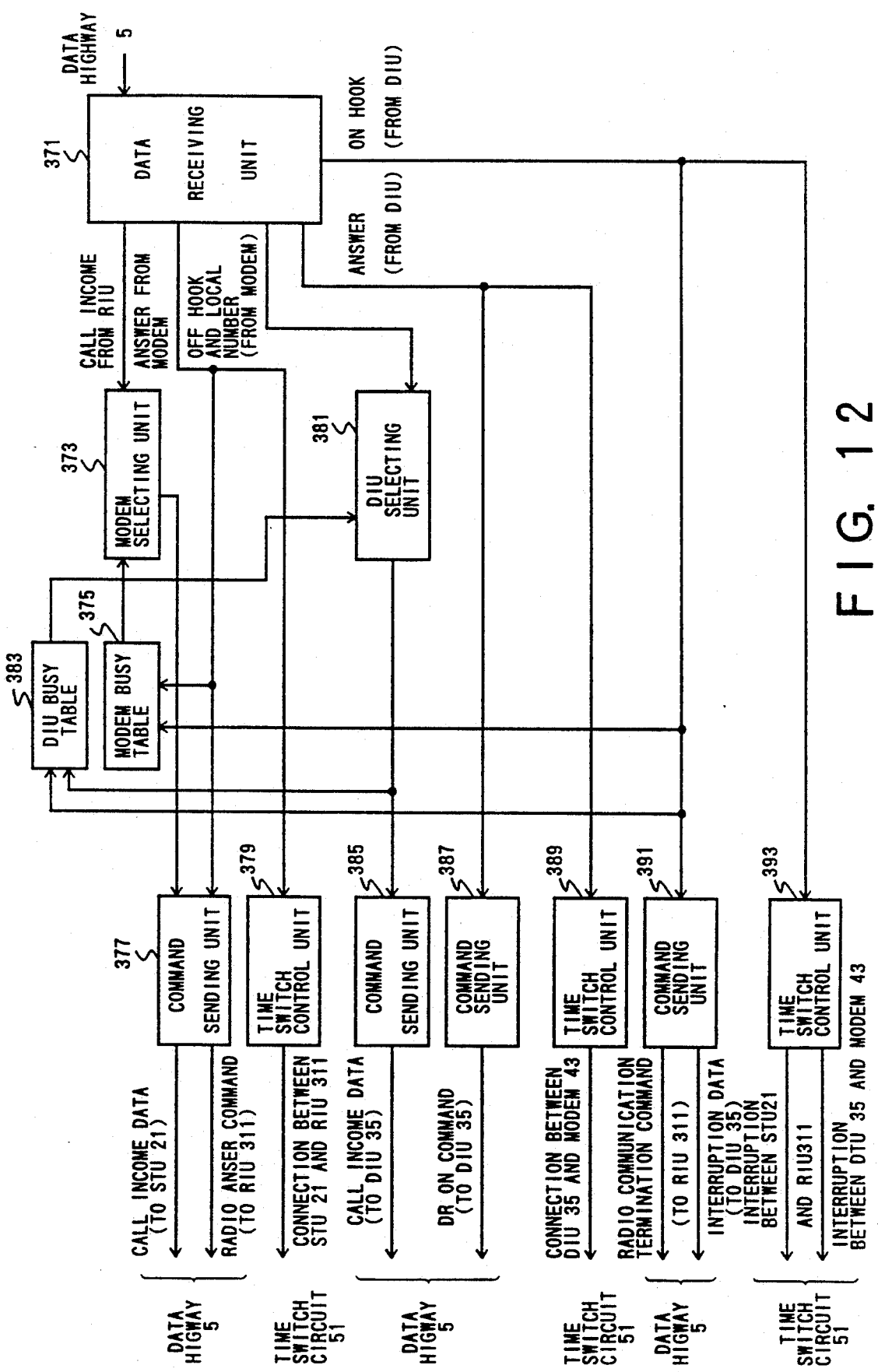
FIG. 12 is a block diagram showing the performance of a microcomputer of the control unit shown in FIG. 10.

FIG. 12 shows performances of the microcomputer 349 in a key service unit 301 with respect to the call and control operation control at the time of an incoming call for the data communication from the radio telephone network.

Figure 13:
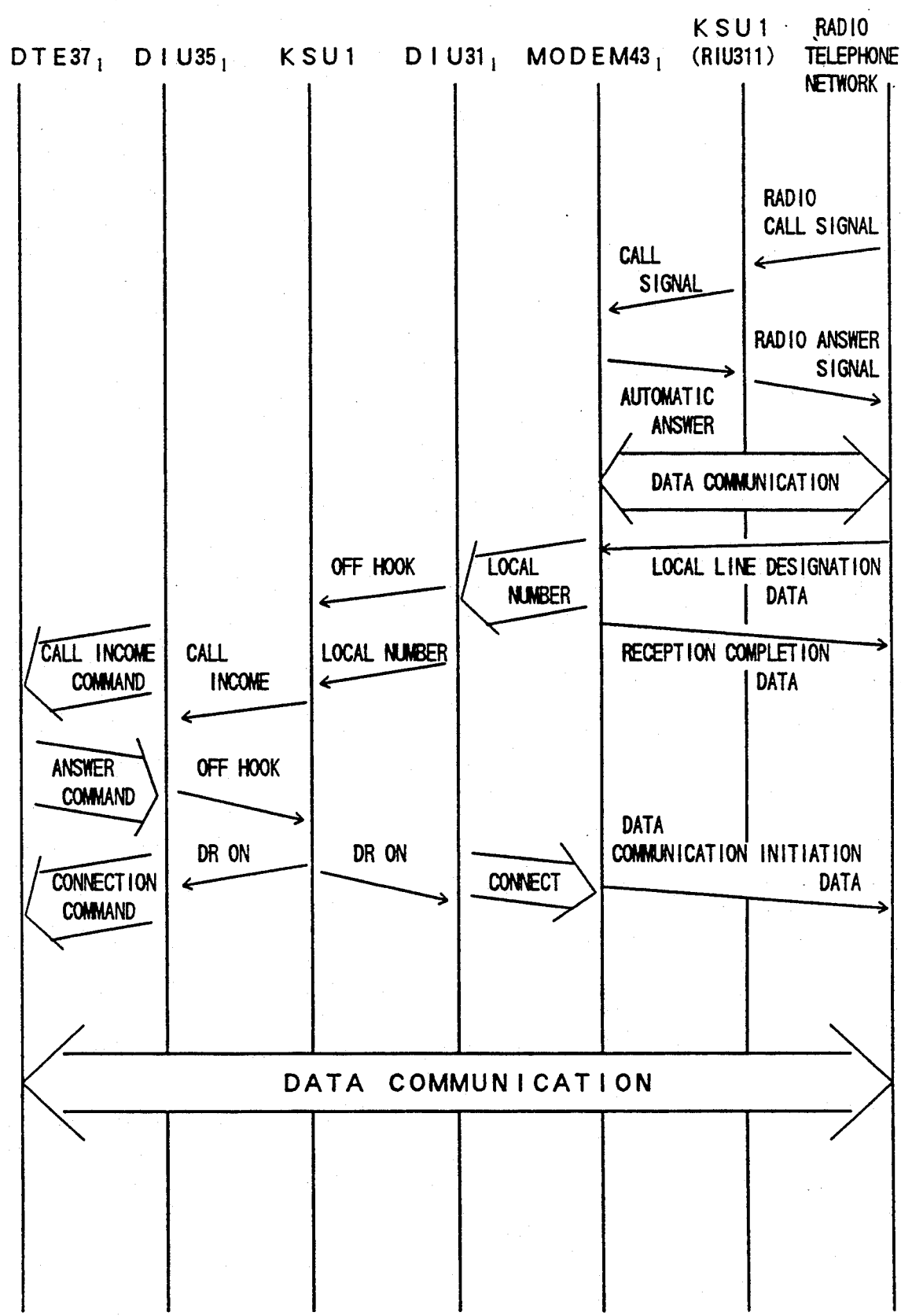
FIG. 13 is a sequence chart showing the operation of the system shown in FIG. 13.

FIG. 13 is a chart showing the sequences of the call and switching operation at the time of the incoming call from the radio telephone network.

The performances and sequences shown in FIGS. 12 and 13 are similar to those of the embodiments shown in FIGS. 8 and 9 except that the office line interface unit (OLU) 25 is substituted by a radio interface unit (RIU) $31_1$ and that the communication between radio interface unit (RIU) 311 and the radio telephone network is changed to follow the specification of the radio telephone network.

Figure 14:
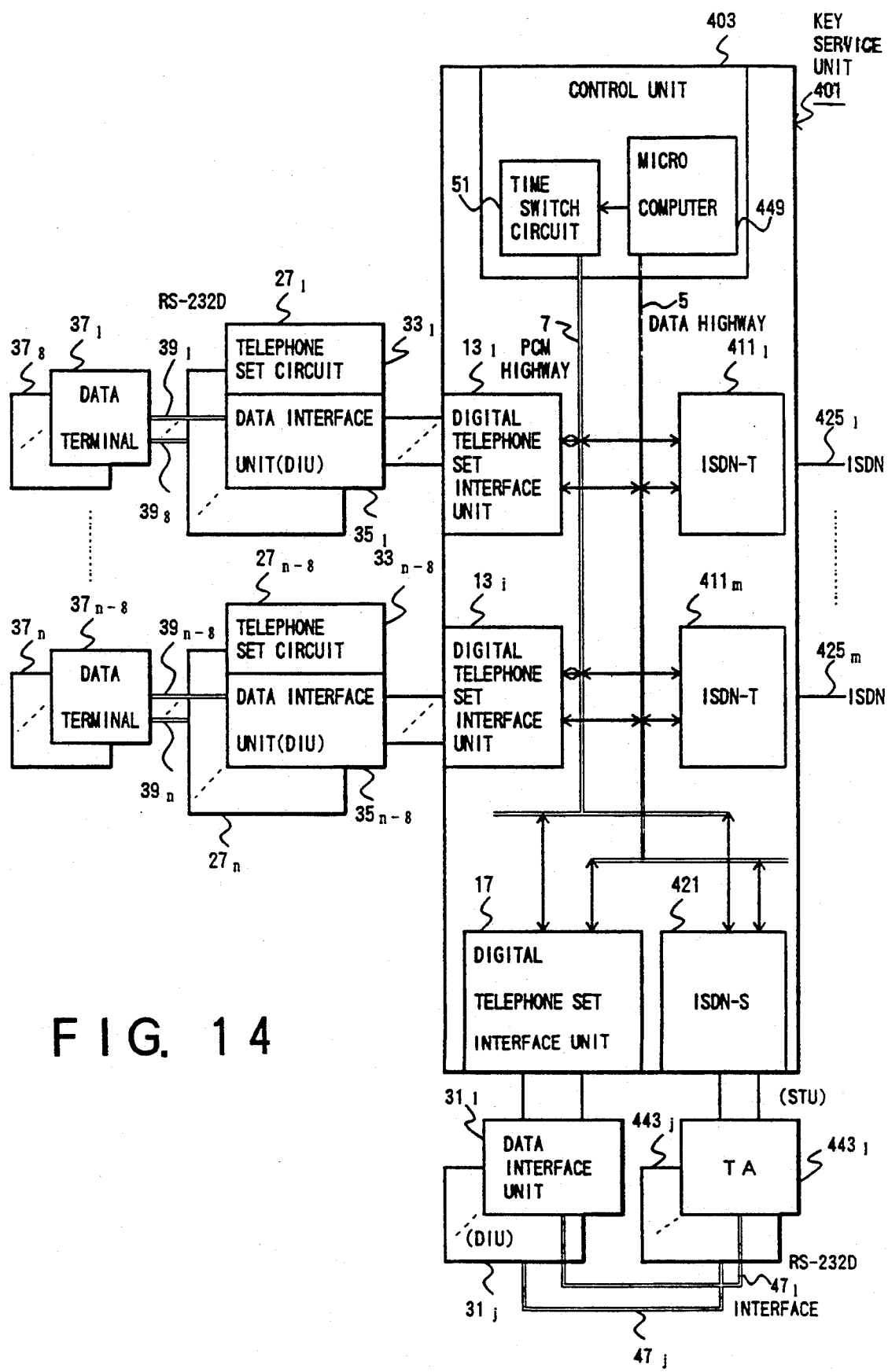
FIG. 14 is a block diagram showing the entire construction of still another embodiment of this invention.

FIG. 14 is a block diagram showing the construction of a further embodiment of this invention.

In this modification, the key service unit 401 includes ISDN-T point interface units $411_1$–$411_m$ which are respectively connected to office lines $425_1$–$425_m$ of ISDN (integrated services digital network). Further, a plurality of terminal adaptors (TA) $443_1$–$443_j$ (only one is shown) having a performance of conversion between RS-232D interface and a user interface (CCITT advise I. 430/TTC standard JT-1430) of the ISDN are pooled. This terminal adaptor 443 has connecting terminals for the ISDN office line, to which is connected an ISDN-S point interface unit 421 in the key service unit 401. The terminal adaptor is further provided with connecting terminals for the data terminal equipment, to which is connected the data interface unit 31. The construction of other parts is similar to that of the system shown in FIG. 1.

Figure 15:
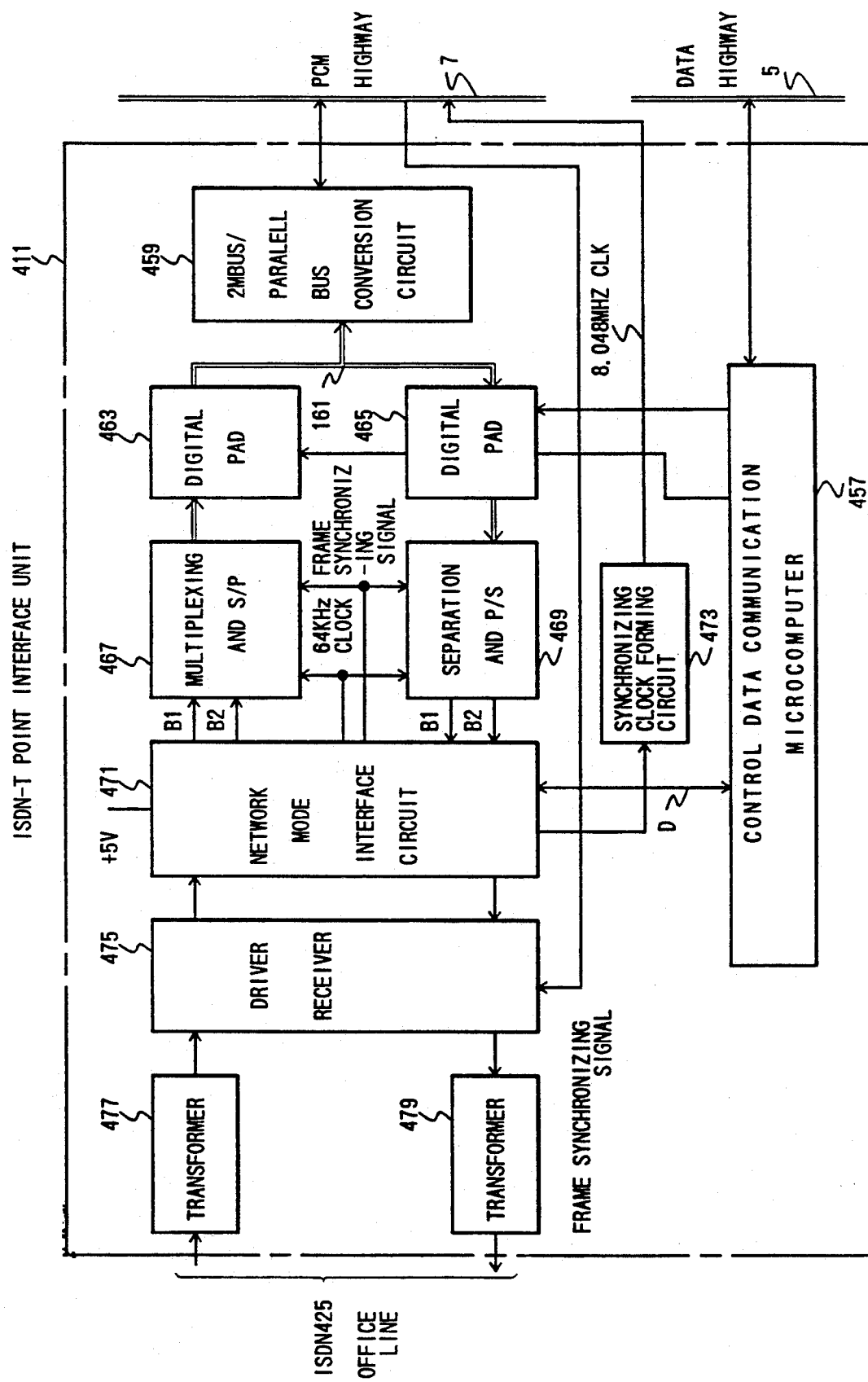
FIG. 15 is a block diagram showing the construction of an ISDN-T point interface unit.

FIG. 15 shows the construction of the ISDN-T point interface unit 411. This unit 411 contains one line of the basic rate (2B±D).

The control data communication microcomputer 457 contains therein a memory circuit, and sends and receives control data to and from ISDN office line 425. Further, the microcomputer 457 exchanges these control data with control unit 403 through control data highway 5. Further, the microcomputer 457 controls digital pads 463 and 465 based on the control data sent from the control unit 403.

A 2M bus/parallel bus converting circuit 459 contains therein a memory device that absorbs the phase difference of frame synchronizing signal between ISDN office line 425 and PCM highway 7, thereby effecting a conversion PCM highway 7 and a parallel bus 461. Digital pads 463 and 465 are constituted by digital memory devices for adjusting the voice level. At the time of data communication these pads are bypassed.

Multiplexing and serial/parallel converting circuit 467 effects multiplexing and serial/parallel conversion of two B channel data from ISDN 23. Further, a separating and parallel/serial converting circuit 469 effects a serial/parallel conversion and separation of two B channel data from a parallel bus 461.

The interface circuit 471 performs the processing of layers 1-3 of the ISDN so as to synthesize and separate two B channels and a single D channel. This interface circuit 471 is set in a network mode to form a frame synchronizing signal synchronous with office line 425 of ISDN and to operate in synchronism with the synchronizing signal. The frame synchronizing signal formed by the interface circuit 471 is also applied to a synchronizing clock pulse forming circuit 473 which generates a clock pulse (having a frequency of 8.048 MHz) slavely synchronized with the frame synchronizing signal and sends this clock pulse to control unit 403 through PCM highway 7, whereby the key service unit 401 as a whole is slavely synchronized with ISDN office line 425.

A driver/receiver 475 converts three value signals (an AMI code, using three values of 0 V, +5 V and −5 V) utilized in the ISDN to a two value signals (0 V and +5 V) utilized in the key service unit. This driver/receiver 475 is connected to ISDN office line 435 through pulse transformers 477 and 470 for effecting a digital data transmission.

Figure 16:
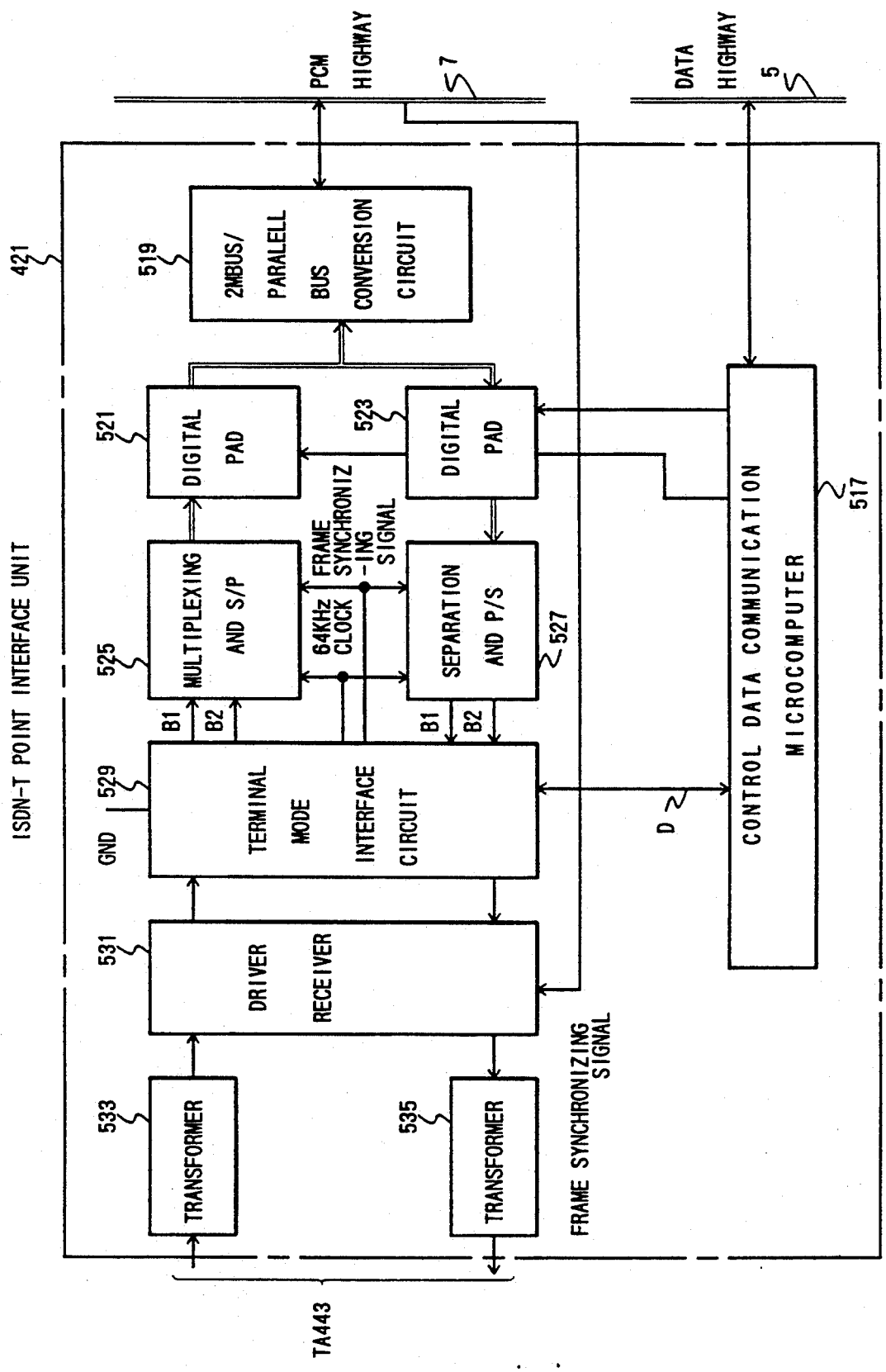
FIG. 16 is a block diagram showing the construction of the ISDN-S point interface unit.

FIG. 16 is a block diagram showing the construction of ISDN-S point interface unit 421. This unit has a construction similar to the ISDN-T point interface unit 411 except that the interface circuit 529 is in the terminal mode. For this reason, a frame synchronizing signal is introduced from PCM highway 7, and ISDN-S point interface unit 421 operates in synchronism with the frame synchronizing signal. Further, since the interface unit 421 operates in slave synchronism with the key service unit 401, the synchronizing clock pulse forming circuit 473 shown in FIG. 15 is not used.

Figure 17:
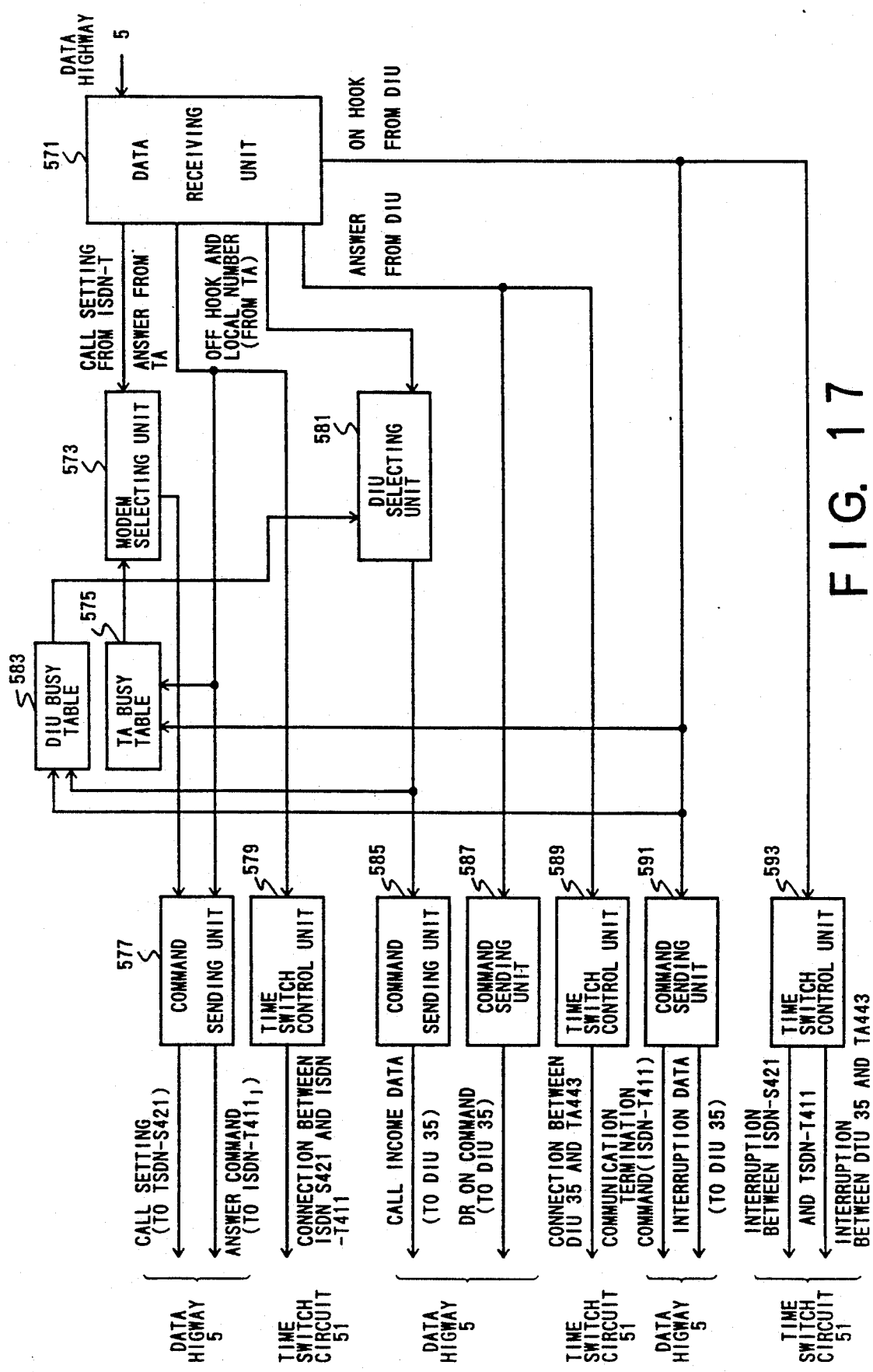
FIG. 17 is a block diagram showing the performance of the microcomputer of the control unit shown in FIG. 14.

FIG. 17 is a block diagram showing the performance of a microcomputer 445 in the key service unit 401 with respect to the call and switching operation control at the time of an incoming call for data communication from the ISDN.

Figure 18:
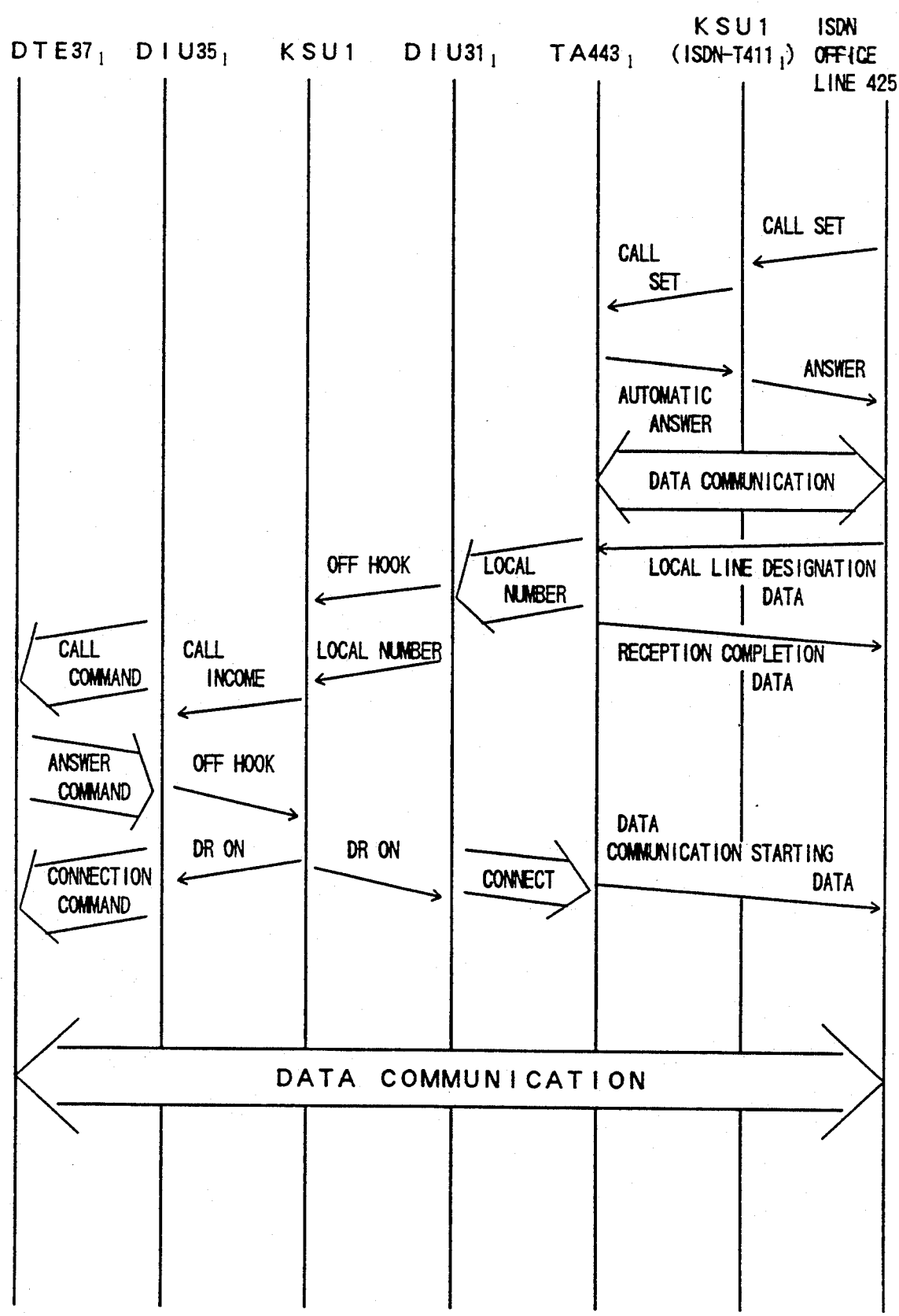
FIG. 18 is a sequence diagram showing the operation of the system shown in FIG. 14.

FIG. 18 is a chart showing the sequences of a call and switching operation in this system.

The performances and the sequences shown in FIGS. 17 and 18 are basically similar to those shown in FIGS. 8 and 9. The main difference lies in that the office line interface unit (OLU) 11 is substituted by ISDN-T point interface unit 411, that the standard telephone unit interface unit (STU) 21 is substituted by ISDN-S point interface unit 421 and that the communication between ISDN-T point interface unit 411 and ISDN office line 425, and the communication between ISDN-S point interface unit 421 and TA 443 are performed according to the specification of ISDN.

It should be understood that this invention is not limited to the embodiments described above, and that many changes and alternations will be obvious to one skilled in the art without departing the true spirit and scope of the invention. For example, in the embodiments described above, the connection between the MODEM or TA and the office line is selectively made through the time switch circuit of KSU. However, this invention is also applicable to a system in which the MODEM or TA is connected directly to a specific office line.

As above described, according to this invention, after the MODEM or TA has answered to an incoming call, the communication data sent from the calling party is used to designate an extension number so that without using a specific apparatus causing cost up as in a MF signal receiver, the calling party can arbitrary select an extension data terminal equipment in the system.

What is claimed is:

1. A key telephone system connected to a communication network and having a plurality of data terminals as extensions, said key telephone system comprising:
    at least one interface conversion unit for performing a conversion between a user interface of said communication network and a data communication interface of each of said data terminals, and for answering an incoming call from said communication network;
    connecting means for interconnecting said communication network and said interface conversion unit;
    switching means for selectively establishing a data communication path between said plurality of data terminals and said interface conversion unit;
    extension calling means for receiving an extension number data contained in succeeding communication data sent from said communication network after said interface conversion unit has answered an incoming call from said communication network, and for sending an incoming call command to a single data terminal designated by said extension number data; and
    switching control means for controlling said switching means to establish said data communication path between said designated single data terminal and said interface conversion unit in order to establish a data communication link between said designated single data terminal and said communication network after a data communication is established between said interface conversion unit and said communication network.

2. The system according to claim 1,
    wherein said connecting means selects a single non-busy interface conversion unit in response to said incoming call from said communication network and informs the selected non-busy single interface conversion unit of said incoming call, and
    wherein, after the selected non-busy single interface conversion unit answers an informed incoming call, a data communication path is established between the selected non-busy single interface conversion unit and said data communication path in order to apply said succeeding communication data to the selected non-busy single interface conversion unit.

3. The system according to claim 1,
    wherein said extension calling means checks a state of said single data terminal designated by said extension number data upon reception of said extension number data, and
    wherein, when said designated single data terminal is not busy, said extension calling means sends said call command to said designated single data terminal.

4. The system according to claim 1 wherein said communication network comprises an analog public telephone network and said interface conversion unit comprises a MODEM.

5. The system according to claim 1 wherein said communication network comprises a public radio telephone network, said interface conversion unit comprises a MODEM and wherein said connecting means includes a radio interface unit for performing a radio communication with said public radio telephone network.

6. The system according to claim 1, wherein said communication network comprises an integrated services digital network (ISDN) and said interface conversion unit comprises a terminal adapter.

7. A key telephone system including a key service unit connected to communication network and a plurality of data terminals connected to said key service unit, said key telephone system comprising:
    an interface conversion unit effecting a conversion between a user interface of said communication network and a communication interface of each of said data terminals;
    wherein said interface conversion unit answers an incoming call from said communication network;
    said interface conversion unit being connected to said key service unit;
    wherein said key service unit includes:
    a communication network interface unit connected to said user interface of said communication network;
    a plurality of first data interface units respectively connected to said data communication interfaces of said plurality of data terminals;
    a user interface unit connected to an interface for said communication network of said interface conversion unit, for affording an identical interface to said user interface of said communication network;
    a second data interface unit connected to an interface for said data terminal of said interface conversion unit, for affording an identical interface to said communication interface of said data terminal;
    a switching unit for selectively forming a data communication path among said communication network interface unit, said plurality of first data interface units, said user interface unit, and said second data interface unit; and
    a microcomputer, connected to said communication network interface unit, said plurality of first data interface units, said user interface unit, said second data interface unit, and said switching unit, for controlling said communication network interface unit, said plurality of first data interface units, said user interface unit, said second data interface unit, and said switching unit;
    wherein said microcomputer includes:
    means for controlling said switching unit for establishing a first data communication path between said communication network interface unit and said second data interface unit so as to supply succeeding communication data from said communication network to said interface conversion unit, when an incoming call reaches said communication network interface unit from said communication network;
    means for receiving an extension number data contained in said succeeding communication data from said interface conversion unit through said second data interface, when said succeeding communication data is inputted to said interface conversion unit, thereby controlling a single said first data interface unit corresponding to a single said data terminal designated by said extension number data so as to send an incoming call command to said designated signal data terminal; and
    means for establishing a second data communication path between said single first data interface unit and said second data interface unit, when said designated single data terminal answers said call command, thereby establishing a data communication link between said designated single data terminal and said communication network through said interface conversion unit after a data communication between said interface conversion unit and said communication network is established.

8. The key telephone system according to claim 7 wherein said communication network comprises an analog public telephone network, said communication network interface unit comprises an office line interface unit connected to an office line of said public telephone network, and wherein said interface conversion unit is a MODEM, and said user interface unit comprises a standard telephone set interface unit to which a standard telephone set can be connected.

9. The key telephone system according to claim 7 wherein said communication network comprises a public radio telephone network, said communication network interface unit comprises a radio interface unit for effecting a radio communication with said public radio telephone network, and wherein said interface conversion unit comprises a MODEM, and said user interface unit comprises a standard telephone set interface unit to which a standard telephone set can be connected.

10. The key telephone system according to claim 7, wherein said communication network comprises an integrated services digital network (ISDN), said communication network interface unit comprises an ISDN-T point interface unit connected to an office line of said ISDN, said interface conversion unit comprises a terminal adaptor, and said user interface unit comprises an ISDN-S point interface unit to which an ISDN terminal can be connected.

* * * * *